United States Patent [19]
MacLennan

[11] Patent Number: 5,113,919
[45] Date of Patent: May 19, 1992

[54] FELLER HEAD

[76] Inventor: Charles D. MacLennan, 153 Cote St-Charles, Hudson Heights, Quebec, Canada, J0P 1J0

[21] Appl. No.: 650,590

[22] Filed: Feb. 5, 1991

[51] Int. Cl.⁵ .............................................. A01G 23/08
[52] U.S. Cl. ................................... 144/34 R; 30/379; 83/478; 83/928; 144/3 D; 144/336
[58] Field of Search ................. 30/379, 379.5; 83/478, 83/928; 144/2 Z, 3 D, 34 R, 335, 336

[56] References Cited
U.S. PATENT DOCUMENTS 2,926,709  3/1960  Kaley ..................................... 83/478
4,446,897  5/1984  Kurelek ................................. 83/928

Primary Examiner—W. Donald Bray
Attorney, Agent, or Firm—Samuel Meerkreebs

[57] ABSTRACT

A feller head having a circular saw at the base thereof with a housing surrounding the circular saw, and an opening in the housing exposing the circular saw. A movable guard can be rotated between an open position within the housing and a closed position where the guard extends across the opening protecting the circular saw. The feller head also has a pair of grapple arms in the upper portion of the frame and an accumulator arm in the lower portion of the frame.

7 Claims, 3 Drawing Sheets

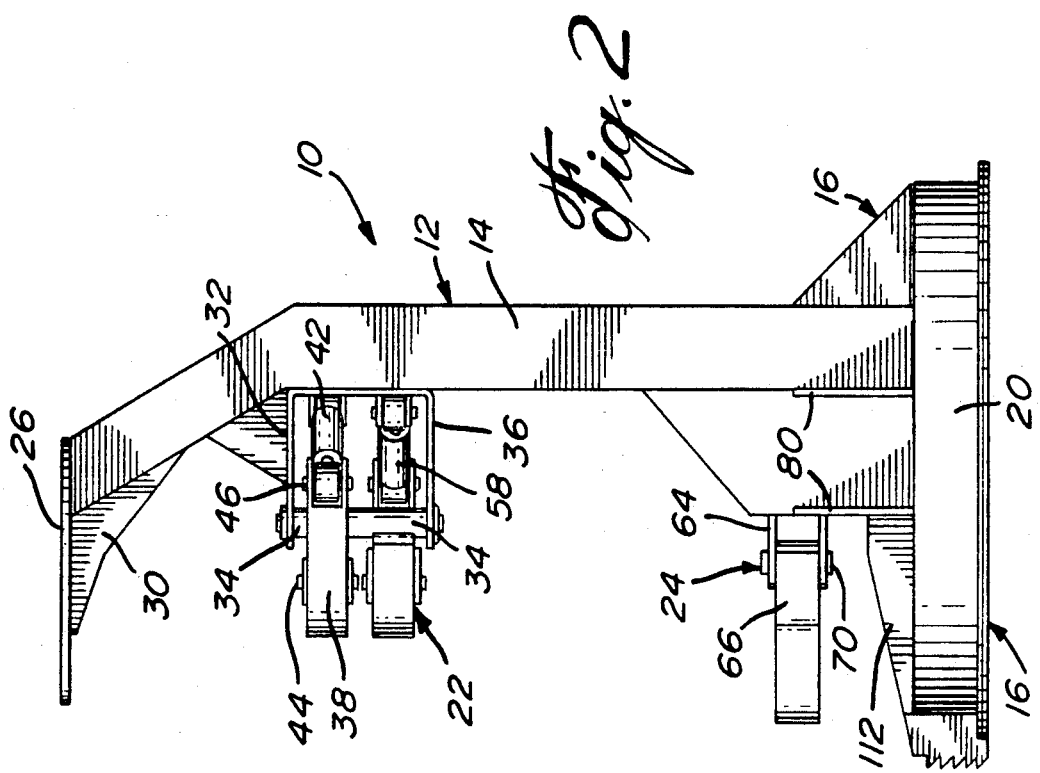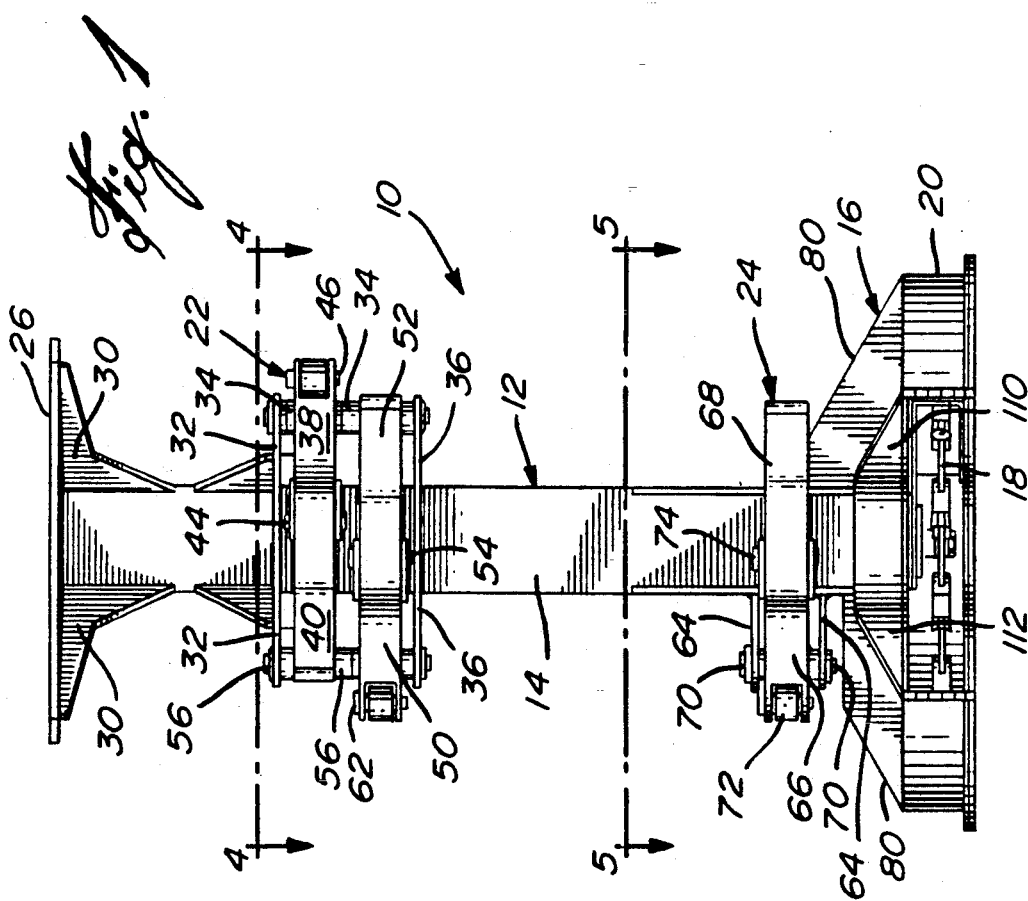

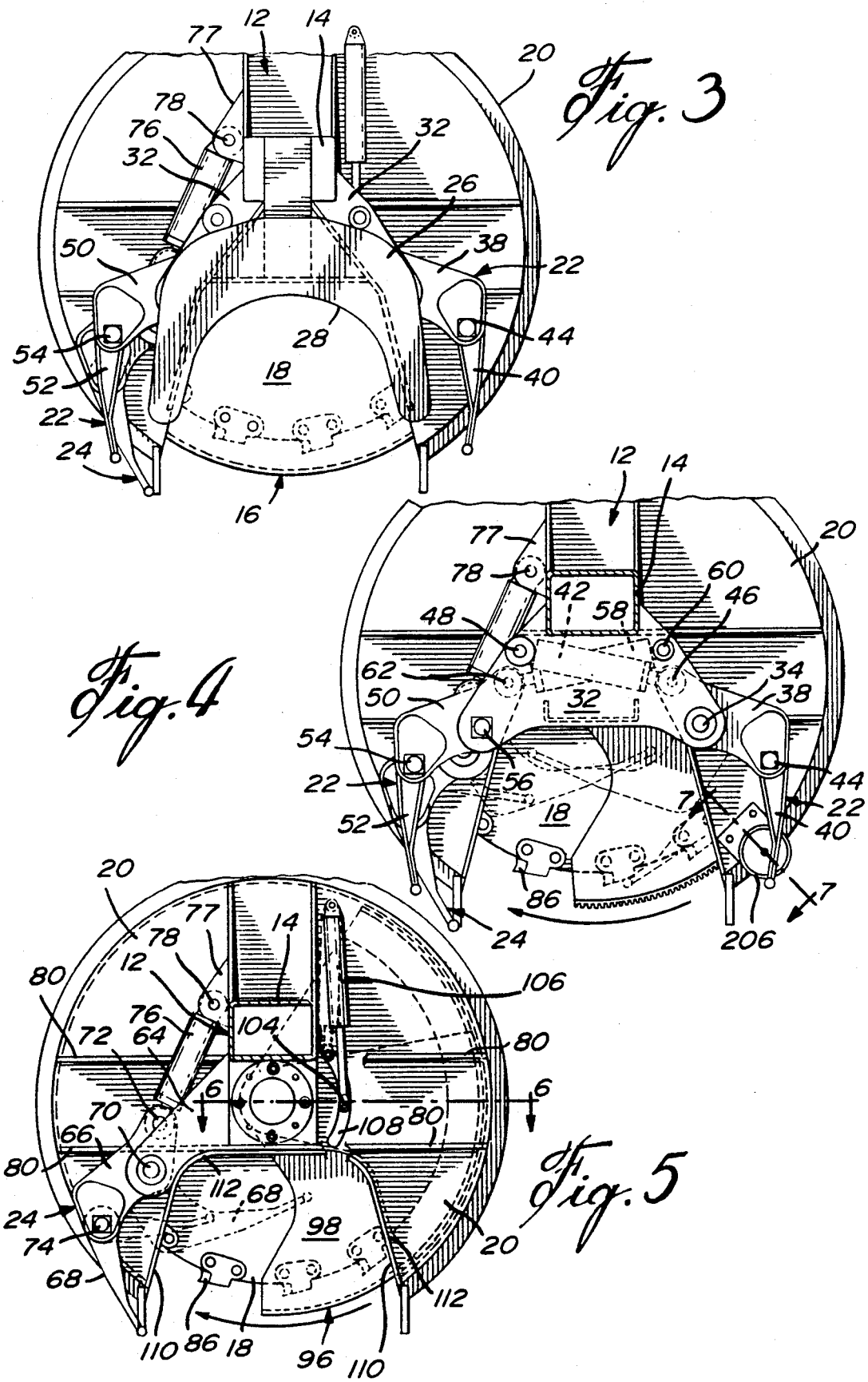

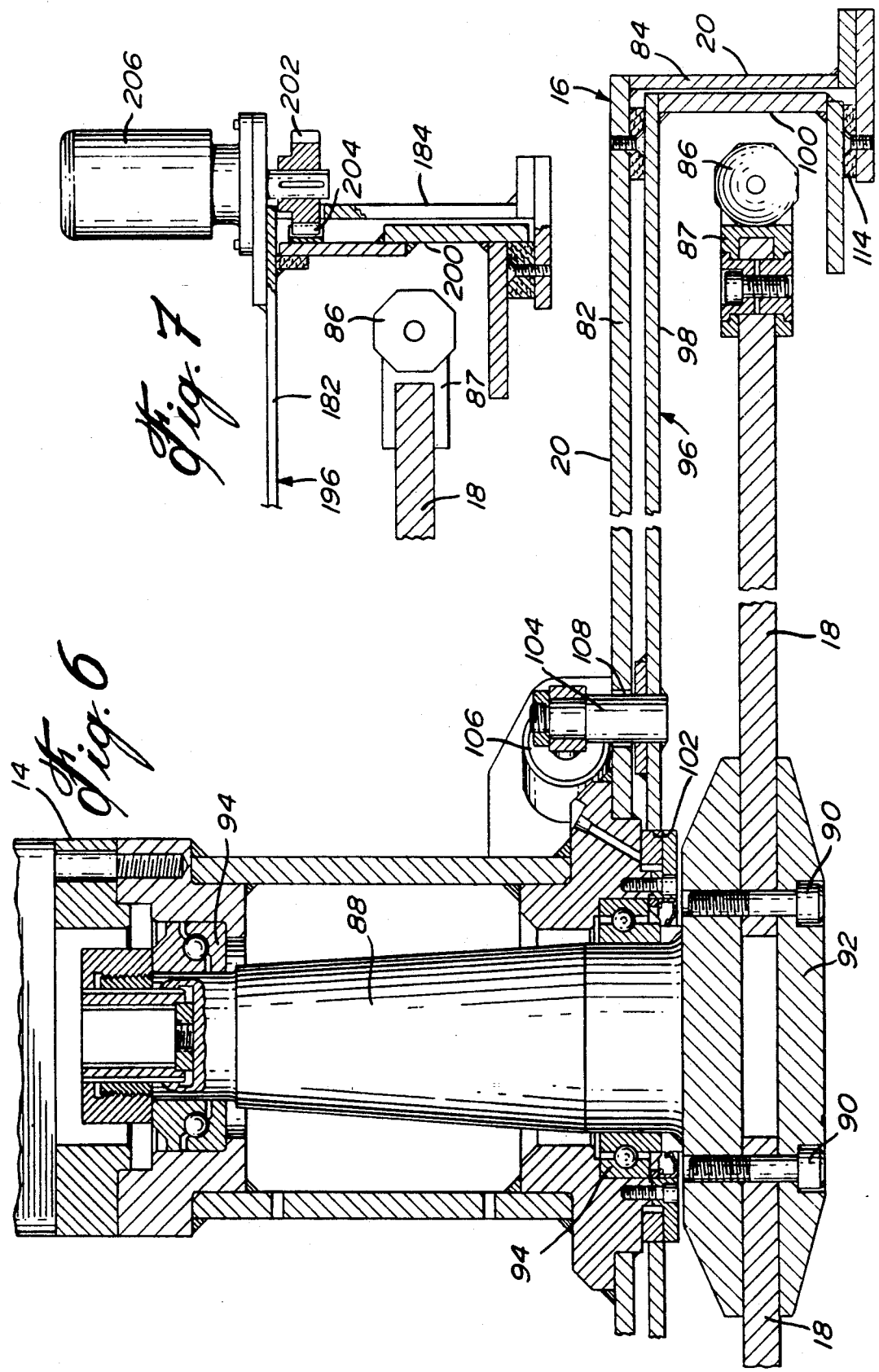

5,113,919

FELLER HEAD

BACKGROUND OF THE INVENTION

1. Field of the Invention

The present invention relates to improvements in feller heads of the type used for felling trees.

2. Description of the Prior Art

There are many patents relating to felling heads. Generally, a felling head includes an upstanding frame adapted to be mounted at the end of a knuckle boom and is hydraulically operated and oriented. Grapple arms are mounted on the frame to engage and hold the tree to be cut, and a cutting device at the bottom of the frame cuts the trunk of the tree at the lowest possible point above the ground. One or more accumulator arms are provided on the frame for retaining the severed tree against the upstanding frame while the feller engages other trees.

In recent years, a circular saw having replaceable teeth has been increasingly utilized as the cutting device. However, since it is so near the ground in operation, especially as it is moved to engage the trunk of a tree, the circular saw is easily damaged. The circular saw can rotate up to 1200 r.p.m., and as the teeth hit an obstacle such as a boulder, they can easily shatter or otherwise be damaged.

The grapple arms are usually placed in the upper part of the frame and in the lower part of the frame near the cutting device. The accumulator arm or arms are provided near the midpoint of the frame. However, in view of the radius of the circular saw, the trunk of the tree, before being severed, is at a distance (at least the radius of the circular saw) from the frame. Thus, when the lower grapple reaches out and engages the tree to hold during cutting, the trunk can be damaged, especially if it is of small diameter.

SUMMARY OF THE INVENTION

It is an aim of the present invention to provide an improved feller head which overcomes the problems mentioned above.

It is also an aim of the present invention to provide a guard member for the circular saw blade when it is not engaging a tree.

A further aim of the present invention is to provide an improved arrangement and location of the grapple arms on the upstanding frame.

A construction in accordance with the present invention includes a feller head comprising an upstanding frame having a base, tree grappling means on the frame and a circular saw mounted for rotation at the base of the frame in a plane at right angles to the longitudinal axis of the frame. A housing surrounds the circular saw and is fixed to the base of the frame. An opening is provided in the housing, exposing the saw at a segment of the periphery thereof for allowing the saw to engage a tree to be severed. A saw guard member is mounted on the housing for movement between a first position whereby the guard member closes the opening in the housing, thereby protecting the periphery of the saw and a second position clear of the opening to allow exposure of the saw. Means are provided on the saw for positively moving the guard between the first and second positions.

In another aspect of the present invention, a feller head is provided having an upstanding frame with a base and including a circular saw at the base, rotatable in a plane at right angles to the axis of the upstanding frame. The upstanding frame has an upper and lower portion, above and below the midpoint of the upstanding frame. At least a pair of articulated grapple arms are provided in the upper portion of the frame for gripping a tree to be severed and at least an accumulator arm provided in the lower portion of the frame for retaining a severed tree against the frame immediately after the tree has been cut.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a front elevation of the feller in accordance with the present invention;

FIG. 2 is a side elevation thereof;

FIG. 3 is a top plan view thereof;

FIG. 4 is a horizontal cross-section, taken along line 4—4 of FIG. 1;

FIG. 5 is a horizontal cross-section, taken along line 5—5 of FIG. 1;

FIG. 6 is an enlarged fragmentary vertical cross-section, taken along line 6—6 of FIG. 5; and FIG. 7 is an enlarged fragmentary cross-section of another embodiment, taken along line 7—7 of FIG. 4.

DESCRIPTION OF THE PREFERRED EMBODIMENTS

Referring now to the drawings, there is shown a feller 10 having a frame 12 made up of a single column 14. A cutting device 16, including a circular saw 18 within a housing 20, is provided at the bottom of the frame 12. Articulated grapple arms 22 are provided in the upper portion of the frame 12 while an accumulator arm arrangement 24 is provided in the bottom portion of the frame 12.

At the top of the column 14 is a plate 26 in which is provided a cut-out 28 adapted to receive a standing tree. Support plates 30 extend between the column 14 and the top plate 26.

The grapple arm arrangement 22 includes a pair of spaced-apart mounting plates 32 and 36. A pivot shaft 34 extends between the support plates 32 and 36, and a grapple arm 38, as seen in FIGS. 1 and 4, is pivotally mounted to the shaft 34 in a dog-leg manner. A spring-loaded finger 40 is pivotally mounted about a pivot pin 44 to the grapple arm 38.

A piston and cylinder arrangement 42 is mounted to a pivot pin 48 extending between the mounting plates 32 and 36 and is connected to the arm 38 by means of connecting pin 46.

A pivot shaft 56 extends between the mounting plates 32 and 36 on the other side thereof and mounts a grapple arm 50 to which a finger 52 is spring-mounted about a pivot pin 54. A piston and cylinder arrangement 58 extends between a mounting pin 60 between the mounting plates 32 and 36 at one end and is connected to an end of the arm 50 at connecting pin 62.

A bracket 64 is mounted in the lower portion of the column 14 and mounts a single accumulator arm 66 to which a finger 68 is pivotally mounted about pivot pin 74. The arm 66 is mounted on the pivot shaft 70 which extends within the bracket 64. A piston and cylinder arrangement 76 extends between a bracket 77 mounted to the frame 12 and the end of the arm 66 at the connecting pin 72. The cylinder is mounted to the bracket 77 about the pivot pin 78.

Reinforcing plates 80 are provided between the frame 12 and the top plate of the housing 20. The top plate of the housing 20 is identified by the numeral 82, and a peripheral side wall 84 extends about the periphery of the top plate 82 enclosing a segment of the circular saw 18.

The circular saw 18 is of conventional construction in the form of a circular plate to which teeth 86 with holders 87 are mounted about the periphery thereof. The plate 18 is mounted by means of a clamping hub 92 to a drive shaft 88 extending axially within the column 14. The clamping hub includes bolts 90. The drive shaft 88 is mounted in bearings 94 as shown in FIG. 6.

The housing 20 includes a segmental cut-out portion 110 with guide plates 112. The opening 110 exposes the circular saw to the tree to which the feller 10 is to be aligned. A guard 96 having a top wall 98 and an arcuate side wall 100 is adapted to move about a circular locus to close the opening 110 or to expose the circular saw 18. The guard 96 includes an opening 102 to accommodate the column 14 and is rotated thereabout.

In the example shown in FIG. 6, an arcuate slot 108 is provided in the top plate 82, as shown in FIG. 5, and a piston and cylinder arrangement 106, mounted to the frame 14 at one end, is connected to a pin 104 which in turn passes through the slot 108 and which is affixed to the top plate 98. Thus, when it is required to open or close the guard 96, the piston and cylinder arrangement is activated to move the pin 104 through the slot 108 and the guard member 96. Bearing strip 114 is provided on a portion of the housing 20 to enable the guard 96 to be supported and to slide in its travel.

In another embodiment of the device for moving the guard 96, there is shown, in FIG. 7, a small hydraulic motor 206 mounted on the periphery of the top wall 182 of the housing 20. A gear 202 is mounted to the hydraulic motor 206 and engages a gear rack 204 provided on the side wall 200. It is contemplated that other motive means can be provided for moving the arcuate guard member 96 or 196 to close the opening 110 or to expose the opening.

In operation, the feller 10, which would normally be mounted on an articulated boom at the front of a vehicle, is advanced to a standing tree with the guard 96 closing the opening 110. The circular saw 18 is made to rotate at its operating speed through drive shaft 88 which is connected to a hydraulic motor, not shown. Grapple arms 22, which include grapple arms 38 and 50, are in their open position, as shown in FIGS. 3 and 4, and the accumulator arm 24 is in its closed position, as shown in FIG. 5. As the feller 10 advances to the tree, the guard 96 is completely open, exposing the rotating circular saw 18. The cut-out 28 in the top plate 26 embraces the tree. The circular saw 18 cuts through the trunk of the tree. The severed tree is then grasped by the grapple arms 22 as they close and the severed tree is moved up against the column 14 while the accumulator arm opens and closes against the tree, and the guard 96 is then closed by actuating the piston and cylinder arrangement 106, or in the case of the embodiment of FIG. 7, the motor 206. The grapple arms 22 are then opened in order to prepare the feller head to be moved to another tree to be severed.

I claim:

1. A feller head comprising an upstanding frame having a base, tree grappling means on the frame, and a circular saw mounted for rotation at the base of the frame in a plane at right angles to the longitudinal axis of the frame, a housing surrounding the circular saw being fixed to the base of the frame, the housing defining an opening exposing the saw at a segment of the periphery thereof to allow the saw to engage a tree to be severed, a saw guard member mounted on the housing for movement between a first position whereby the guard member encloses the opening in the housing, thereby protecting the periphery of the saw, and to a second position clear of the opening to allow exposure of the saw, and means provided on the housing for positively moving the guard between the first and second positions.

2. A feller head as defined in claim 1, wherein the guard member is in the form of a segment rotatably movable within the housing and including a first top plate spaced over the circular saw and parallel thereto, and side walls which extend arcuately along the periphery of the top plate of the guard member to protect the teeth on the circular saw when the guard member closes the opening in the housing.

3. A feller head as defined in claim 2, wherein the means for positively moving the guard member between first and second positions include a piston and cylinder arrangement mounted on the housing and an arcuate slot defined in the top plate of the housing with a connecting pin extending from the piston to the guard member whereby actuation of the piston and cylinder will cause the guard member to rotate between the first and second positions.

4. A feller head as defined in claim 2, wherein the guard member includes a segment of an arcuate top plate and a side wall at the periphery of the top plate of the guard member to protect the teeth on the circular saw, the top plate of the guard member extends over the circular saw and is within the housing, an elongated arcuate rack on the side plate of the guard member, and a hydraulic motor mounted on the housing with a gear wheel driven by the hydraulic motor and adapted to engage the rack on the exterior of the side plate of the guard member to rotate the guard member between the first and second positions.

5. A feller head comprising an upstanding frame with a base and including a circular saw at the base rotatable in a plane at right angles to the axis of the upstanding frame, the upstanding frame having an upper and lower portion above and below the midpoint thereof, and a pair of articulated grapple arms provided in the upper portion of the frame for gripping a tree to be severed, and at least an accumulator arm provided in the lower portion of the frame for retaining the severed tree against the frame immediately after the tree has been cut.

6. A feller head as defined in claim 5, wherein the upstanding frame is a single column extending upwardly from the base and a pair of grapple arms are provided vertically spaced in the upper portion with piston and cylinder arrangements arranged on the column for opening and closing the pair of grapple arms, and the accumulator arm being pivotally mounted on a bracket mounted on the column in the lower portion of the frame, and a piston and cylinder arrangement adapted to open and close the accumulator arm.

7. A feller head as defined in claim 6, wherein a pair of parallel spaced-apart mounting plates are mounted to the column in the upper portion of the frame, a pair of pivot shafts extending between the plates for pivotally mounting the respective grapple arms, and the respective piston and cylinder arrangements are mounted between the mounting plates.

* * * * *